United States Patent [19]

Brooks

[11] 4,294,176
[45] Oct. 13, 1981

[54] PORTABLE HOIST FRAME

[76] Inventor: Albert C. Brooks, 2023 W. Lexington St., Baltimore, Md. 21223

[21] Appl. No.: 26,815

[22] Filed: Apr. 4, 1979

[51] Int. Cl.³ .............................................. B61D 17/00
[52] U.S. Cl. .................................. 105/363; 414/542; 104/126; 212/140
[58] Field of Search ..................... 414/542; 212/10, 11, 212/12, 13, 14; 104/126, 91, 95, 89, 93, 90, 92, 242, 247, 248; 280/79.3; 105/363, 141, 148, 155, 154

[56] References Cited

U.S. PATENT DOCUMENTS

| | | | |
|---|---|---|---|
| 1,758,580 | 5/1930 | Moore | 212/11 |
| 2,156,424 | 5/1939 | Barnard | 414/542 |
| 2,292,870 | 8/1942 | Dixon | 414/542 |
| 2,778,512 | 1/1957 | Strona | 414/542 |
| 2,779,486 | 1/1957 | Klein | 414/542 |
| 2,927,704 | 3/1960 | Condon | 414/542 |

*Primary Examiner*—Allen N. Knowles
*Attorney, Agent, or Firm*—Walter G. Finch

[57] ABSTRACT

The invention is an improved portable hoist frame for use in automotive and other type work that requires a frame from which to hang a hoist to lift automotive components and other objects. The portable frame consists of detachable elements for a knock-down disassembly to facilitate transportation and handling thereof. The disassembly can be into four major subassemblies or further disassembled into individual members. Four wheel-like rollers on the frame permit movement on a base or framework of equipment on which work is being performed. Four clip-like attachments prevent sidewise movement of the frame during use. A hoist is attached to the top member of the assembled frame.

10 Claims, 7 Drawing Figures

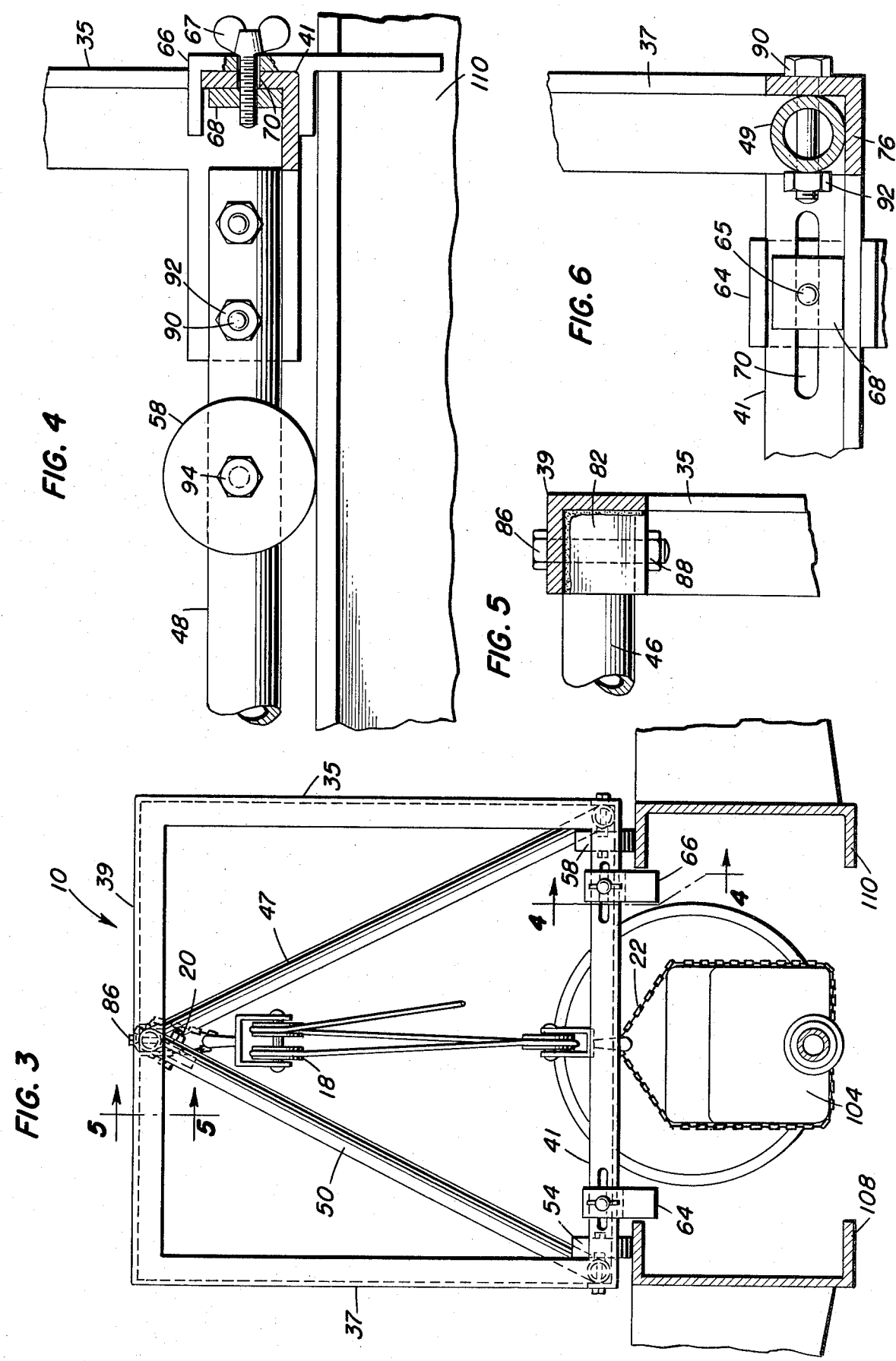

PORTABLE HOIST FRAME

BACKGROUND AND SUMMARY OF THE INVENTION

The invention relates to hoists and cranes and in particular to the framework for hoists. Specifically, the invention relates to portable frameworks, and more specifically to such portable frameworks usually related to automotive work.

A need has existed for a long time for a portable framework that could be disassembled partially into sub-assemblies or totally into its component members. But in such disassembly a portable hoist framework that is simple to reassemble quickly and easily. Such a portable framework has been particularly needed in certain automotive type work.

The framework in this invention may be made round or square or other configuration tubular members or of angle or other metal structural shapes. All such type of members are within the scope and intent of this invention.

When the framework is assembled it is in effect a cubical-like enclosure with internal members to hold the hoist mechanism. The framework can be disassembled into four major sub-assemblies, two end frame sub-assemblies and two internal strut sub-assemblies. As noted previously, the invention is such that can be made so that the sub-assemblies can be further disassembled into the individual members.

The invention is primarily intended for use on cab-over-engine type trucks for removal of such heavy automotive type components such as transmissions, drive shafts, clutches, differentials, and similar automotive units. The frame, however, can also be used in other situations where its portability and flexibility fits the situation.

Two wheel-like rollers are mounted on each side of the assembled framework so that the framework can be rolled along the body or chassis framework to an exact position over the unit to be lifted. The frame of the vehicle serves as a track. Four adjustable brackets at each corner can be adjusted and fastened so that the wheel like rollers will not move sideways and slip off the frame. The brackets extend below the wheels and, with clearance, prevent sidewise movement by bearing against the vehicle frame.

The disassembly into four major sub-assemblies, or into all the sub-members of the sub-assemblies, may be done quickly and easily. The disassembly also makes it easier to store the frame when not used and easy to transport it from one place to another.

It is, therefore, an object of the invention to provide a portable hoist frame that can be easily and quickly disassembled.

It is another object of the invention to provide a portable hoist frame that can be used on an automotive chassis frame.

It is also an object of the invention to provide a portable hoist frame that can be easily moved along an automotive chassis frame to position it over an automotive unit to be raised or lifted.

It is still another object of the invention to provide a portable hoist frame that can support a hoist unit within the frame work.

It is yet another object of the invention to provide a portable hoist frame that has means for preventing it from moving sideways on an automotive chassis frame.

Further objects and advantages of the invention will become more apparent in the light of the following description of the preferred embodiments.

BRIEF DESCRIPTION OF THE DRAWINGS

FIG. 3 is end view on line 3—3 of FIG. 1;

FIG. 4 is a partial sectional view on line 4—4 of FIG. 3;

FIG. 5 is a partial sectional view on line 5—5 of FIG. 3;

FIG. 6 is a partial sectional view on line 6—6 of FIG. 1; and

FIG. 7 is a partial sectional view on line 7—7 of FIG. 1.

DESCRIPTION OF THE PREFERRED EMBODIMENTS

Figure 1:
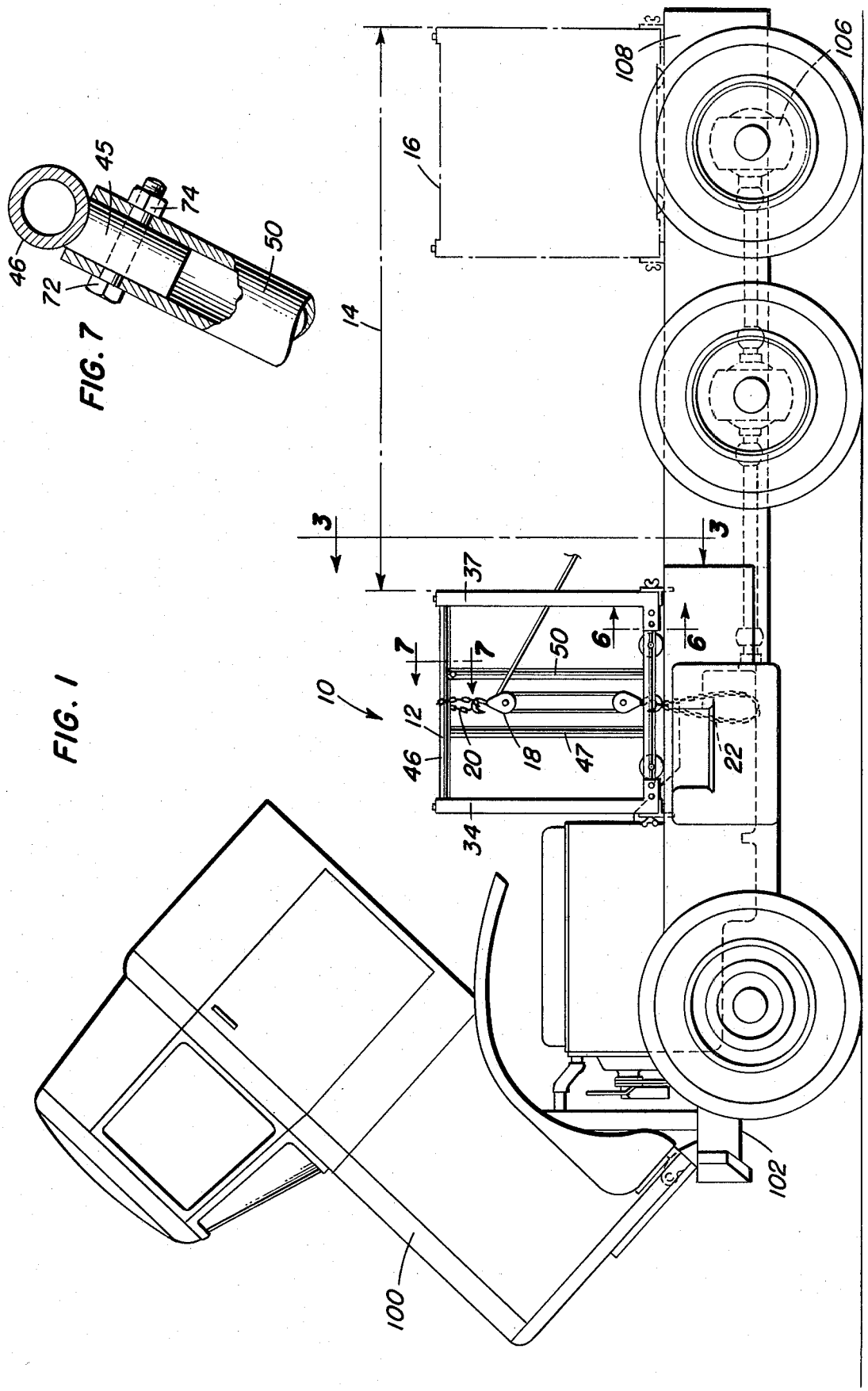
FIG. 1 is a perspective view of a portable hoist frame on a truck chassis.

Referring to the drawings, and particularly to FIGS. 1 and 3, a portable hoist frame is seen at 10.

In FIG. 1 the hoist frame 10 is seen in a typical most forward position 12 on a typical cab-over-engine truck 100 chassis frame 102. The cab-over-engine truck 100 is shown with the cab portion in raised position and without a truck body on the chassis frame 102. For major work the removal of the body or the raising of the body, such as a dump truck would be a typical arrangement for certain major repairs.

In FIGS. 1 and 3, the truck channels 108 and 110 as part of the truck chassis 102 can be seen with the portable hoist frame 10 mounted thereon.

In FIG. 1, as noted previously, the portable hoist frame 10 is shown in a typical most forward position 12. Likewise, a portable hoist frame 10 is shown in a typical most rearward position 16. The range of positions is indicated by the dimension line 14.

Typical automotive units that may be handled by a hoist on a portable hoist frame 10 are a rear drive mechanism 106 in FIG. 1 or a transmission unit 104 in FIG. 3.

In FIGS. 1 and 3 a typical portable hoist 18 is shown mounted in the portable hoist frame 10. A typical means of mounting such a portable hoist 18 is by a loop of chain 20, suitably fastened. A load, picked up on the hook of such a portable hoist 18, may be secured to the hook by a typical means such as a loop of chain 22, suitably fastened.

The portable hoist frame 10 has four major sub-assemblies: a forward or front end frame 30; a rearward or back end frame 32; a left or "T" strut frame 44; and a right or "H" strut frame 42.

The aforementioned sub-assemblies are fabricated from various members as hereinafter described. It is to be noted that the assembly of these members into the aforementioned sub-assemblies as shown in the drawings is of a permanent nature, such as by welding or riveting. However, it is to be understood that it is within the scope and intent of this invention to fabricate the various members into the various sub-assemblies by bolting or other means at corners and points of connection or interfacing.

Front end frame 30 and back end frame 32 are similar and when in position for assembly into the portable hoist frame 10, are mirror images of each other.

As to the members of the front end frame 30 and back end frame 32, they are described hereinafter as similar parts. Vertical members 34 and 36 of the front end frame 30 are similar to vertical members 35 and 37 respectively of backend frame 32. Top member 38 and bottom member 40 of front end frame 30 are similar to top member 39 and bottom member 41 respectively of back end frame 32.

Both the front end frame 30 and the back end frame 32 have a typical connection clip 76 at each lower corner (two on each said frame). Likewise, both the front end frame 30 and the back end frame 32 have a typical connection bracket pocket 82 at the center of the top members 38 and 39 respectively. The connection bracket pocket 82 serves as a locator and prevents movement sideways. It is to be understood that it is within the scope and intent of the invention that the connection bracket pocket 82 may be mounted on the top side or external side of the top members 38 and 39.

A pair of typical slots 70, are on each side of the bottom members 40 and 41 are used, as later described, for mounting the left and right security brackets 60 and 62 to the front end frame 30 and the left and right security brackets 64 and 66 to the back end frame 32.

The "T" strut frame 44 is fabricated from a horizontal member 49 at the bottom location and a vertically inclined strut 50.

The "H" strut frame 42 is fabricated from a bottom horizontal member 48, a top horizontal member 46, and a vertically inclined strut 47 between and connecting the bottom and top horizontal members 48 and 46 respectively.

Top horizontal member 46 has a stub attachment 45 thereon that fits into vertical inclined member 50 to make the connection of the two.

It is to be noted that the configuration shown for the members 34, 35, 36, 37, 38, 39, 40, and 41 is one form. It is to be understood that it is within the scope and intent of the invention that the configuration of these members may be square, round, solid, or tubular-like or any other configuration.

Likewise, it is to be noted that the round tubular configuration of members 46, 47, 48, 49, and 50 is typical. It is to be understood that it is within the scope and intent of the invention that the configuration may be square or any other configuration.

It is also to be understood that it is within the scope and intent of this invention that the connection of member 49 to member 50 and the connection of member 47 to members 46 and 48 may also be made by a stub connection similar to stub attachment 45.

To assemble the sub-assemblies 30, 32, 42, and 44 into the portable hoist frame 10, the parts as shown in the drawings are connected by bolts and nuts as hereinafter described. It is to be understood, however, that the use of pins or other connection means is within the scope and intent of this invention.

Connections at the four bottom corners are made by bolt and nut connections through typical holes 80 in members 48 and 49 and typical holes 78 in typical connection clips 76. This typical connection is shown in FIGS. 4 and 6 using bolt 90 and nut 92.

Member 50 is connected to the stub 45 on member 46 by a bolt 72 and nut 74 through the matching holes in the member 50 and stub 45. This connection is shown in detail in FIG. 7.

Member 46 is connected at each end to members 38 and 39 respectively by a bolt 86 through typical hole 84 in the top members 38 and 39 and secured by a nut 88. This typical connection is shown in FIG. 5.

Figure 2:
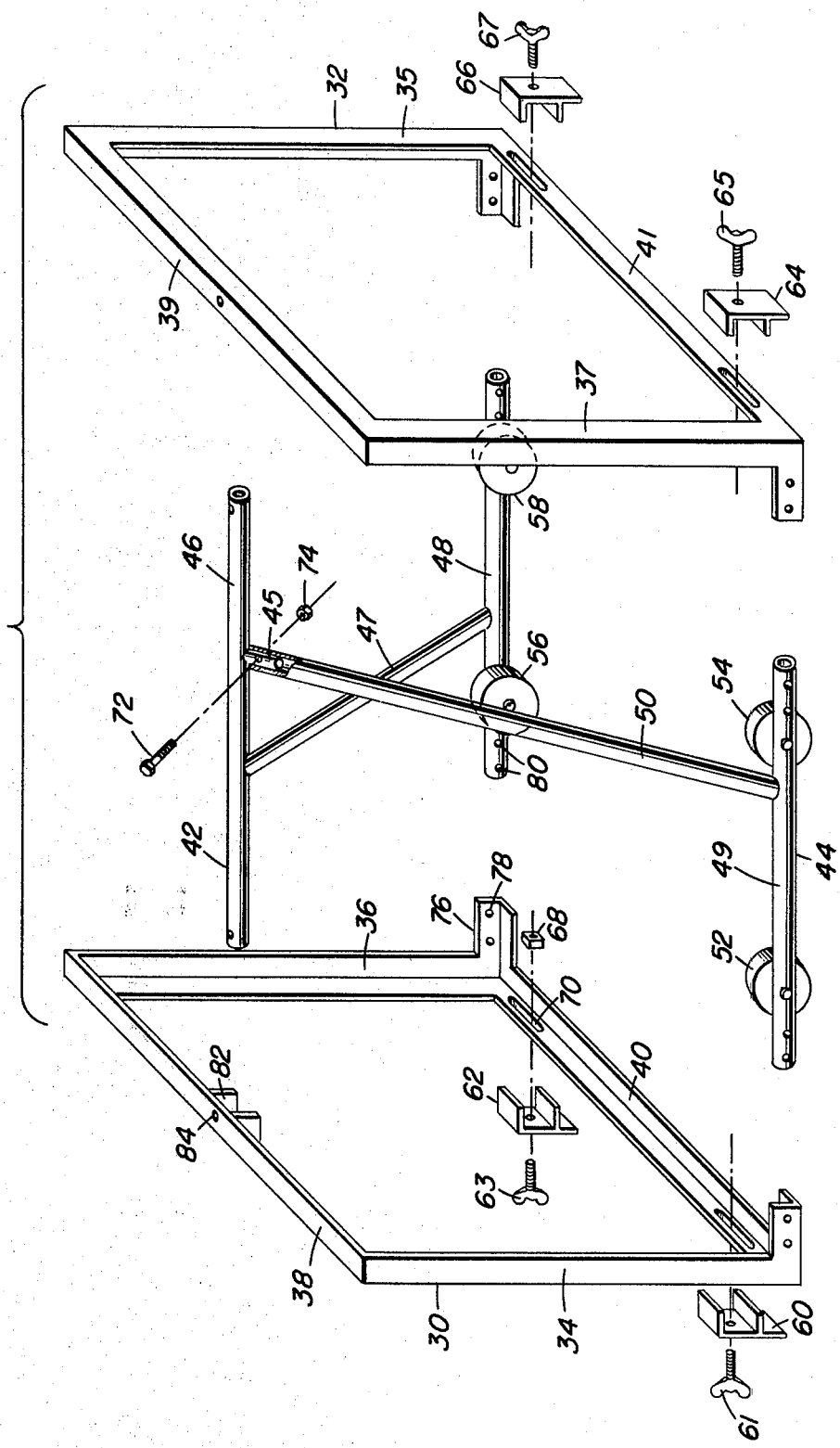
FIG. 2 is an exploded view of a portable hoist frame into sub-assemblies and parts.

Four wheel-like rollers 52, 54, 56, and 58 are fastened to the bottom of the portable hoist frame 10 so that the assembly can be positioned along the chassis frame 102. As shown in FIG. 2, wheel-like rollers 52 and 54 are on member 49 and wheel-like rollers 56 and 58 are on member 48. The wheel-like rollers are attached by a stud type axle 94 as shown in FIG. 4.

The positioning of the wheel-like rollers 52, 54, 56, and 58 can be seen in FIG. 3 where rollers 54 and 58 are shown on chassis channels 108 and 110.

In order to keep the wheel-like rollers 52, 54, 56, and 58 on the chassis channels 108 and 110, the security clips 60, 62, 64, and 66 are connected to the end frames 30 and 32 with wing bolts 61, 63, 65, and 67 and a typical nut 68. It is to be noted that a standard bolt with a wing nut may be used instead of standard bolts and nuts. The use of a wing bolt or a wing nut simplifies the assembly and disassembly. This connection is shown in detail in FIGS. 4 and 6. The typical slot 70 permits adjusting and positioning the security clips 60, 62, 64, and 66 in accordance with the width of the flanges on the chassis channels 108 and 110. As shown in FIG. 3, it can be seen how said security clips prevent movement of the portable hoist frame 10 sideways as said wheel-like rollers move along said chassis channels.

The hoist used with the portable hoist frame 10 is attached to the center of member 46 at a point between members 47 and 50 where they connect and interface with member 46.

Also, as can be readily understood from the foregoing description of the invention, the present structure can be configured in different modes to provide the ability to serve as a portable hoist frame.

Accordingly, modifications and variations to which the invention is susceptible may be practiced without departing from the scope and intent of the appended claims.

What is claimed is:

1. An easily assembled and dis-assembled portable hoist frame comprising:
   a first end frame means, said first end frame means having a top and bottom and side members;
   a second end frame means, said second end frame means being similar to said first end frame means and spaced therefrom;
   a first horizontal frame means, said first horizontal frame means having a vertically inclined strut member, said first horizontal frame means being connected to said first and second end frame means at both the top and at the bottom of said first and second end frame means;
   a second horizontal frame means, said second horizontal frame means having a vertically inclined strut member connected to said first horizontal frame means, said second horizontal frame means being connected to said first and second end frame means at the bottom of said first and second end frame means;
   a plurality of wheel-like means, said plurality of wheel-like means being attached to said first and second horizontal frame means to provide positioning flexibility to said portable hoist frame in a first direction of movement; and a plurality of clip means, said plurality of clip means being attached to said first and second end frame means to secure said portable hoist frame against a movement in a second direction of movement perpendicular to said first direction of movement when being positioned on said wheel-like means.

2. The portable hoist frame recited in claim 1, wherein said first and second end frame means are of a square configuration.

3. The portable hoist frame recited in claim 1, wherein said first horizontal frame means is of an "H" configuration.

4. The portable hoist frame recited in claim 3, wherein said second horizontal frame means is of a "T" configuration.

5. The portable hoist frame recited in claim 1, wherein said plurality of clip means are adjustable to a plurality of positions.

6. The portable hoist frame recited in claim 1, wherein said first and second end frame means, and said first and second horizontal frame means are each fabricated by welding.

7. The portable hoist frame recited in claim 1, wherein said first and second end frame means, and first and second horizontal frame means are each fabricated by use of bolts and nuts at each connection point.

8. The portable hoist frame recited in claim 4, wherein said second horizontal frame means is connected to said first horizontal frame means by a stud-like means on said first horizontal frame means projecting into a cavity in said second horizontal frame means.

9. The portable hoist frame recited in claim 1, wherein said first and second horizontal frame means are connected to said first and second end frame means at the bottom thereof by bolt and nut means.

10. The portable hoist frame recited in claim 1, wherein said first horizontal frame means is connected to the top of said first and second end frame means by bolt and nut means.

* * * * *